United States Patent Office 3,487,748
Patented Jan. 6, 1970

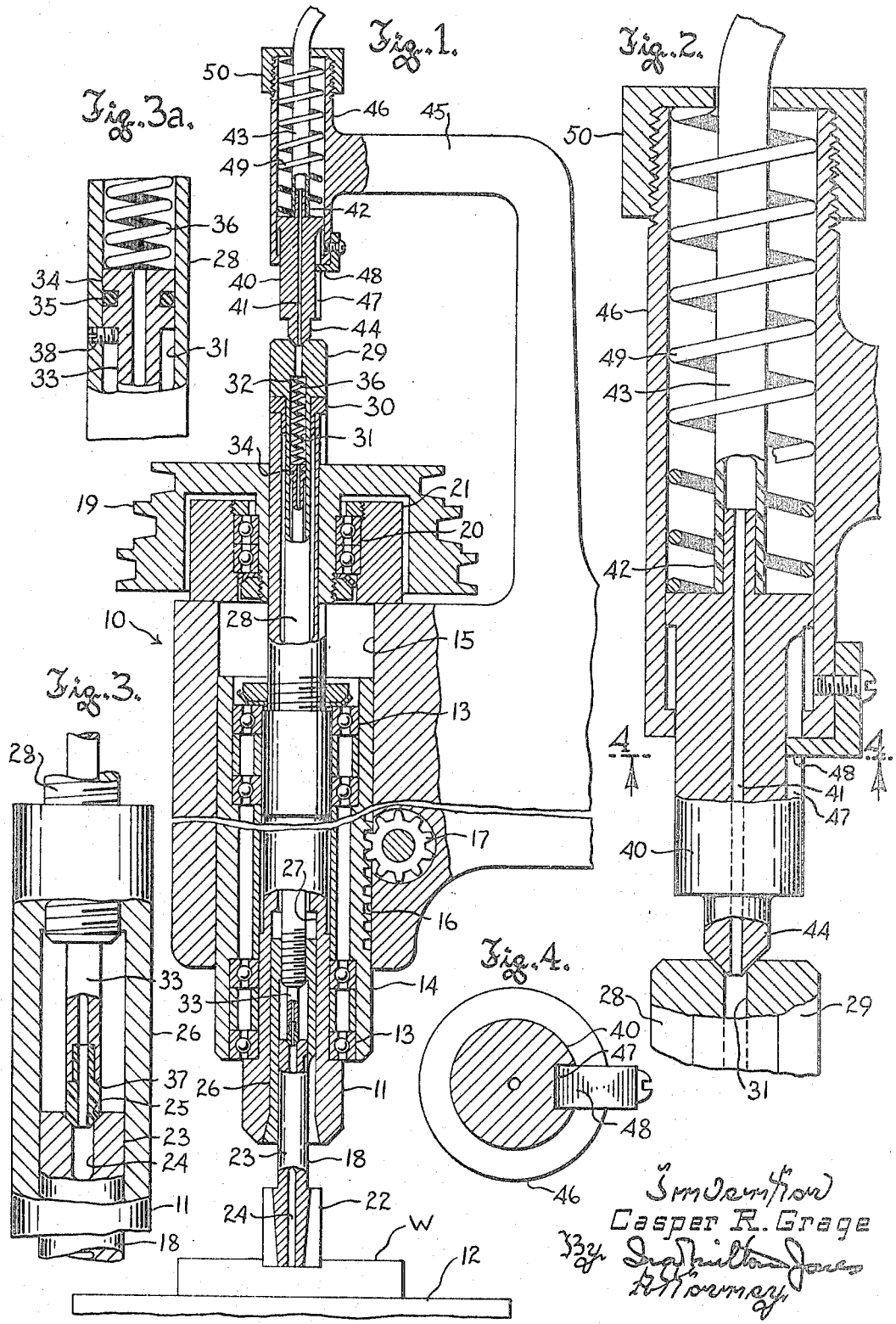

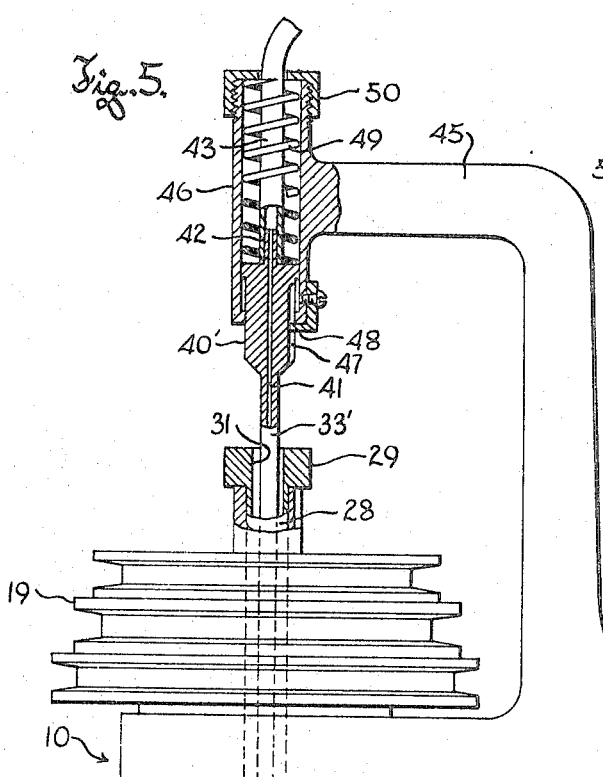
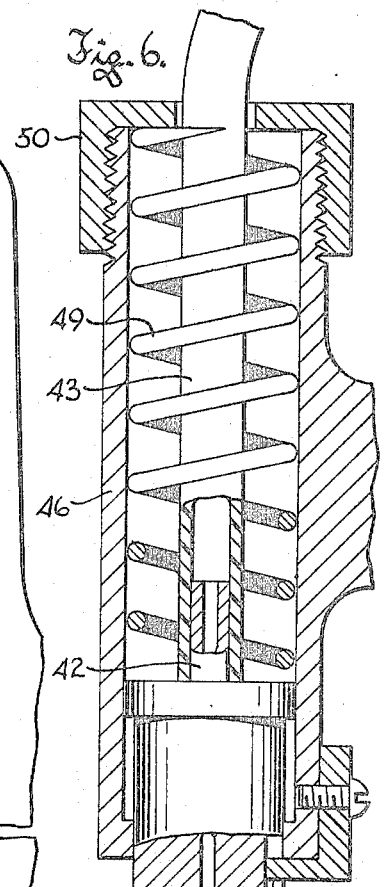
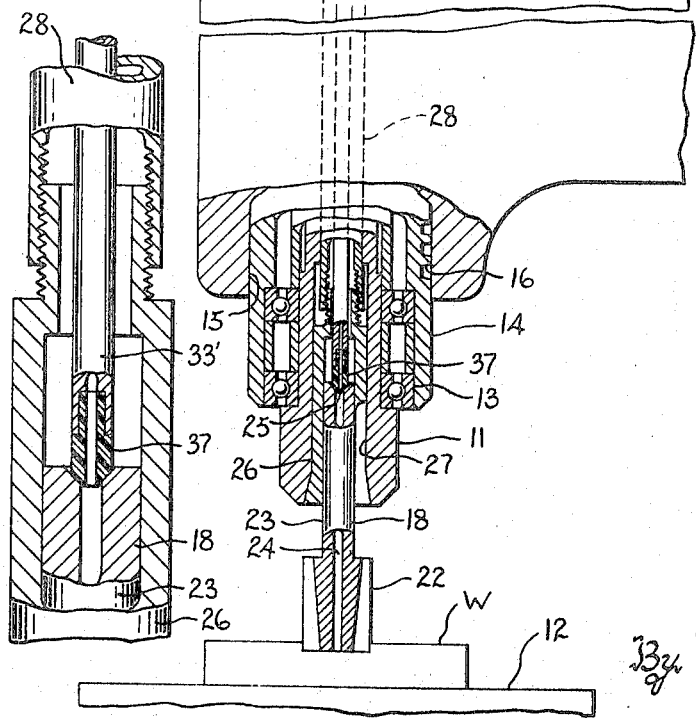

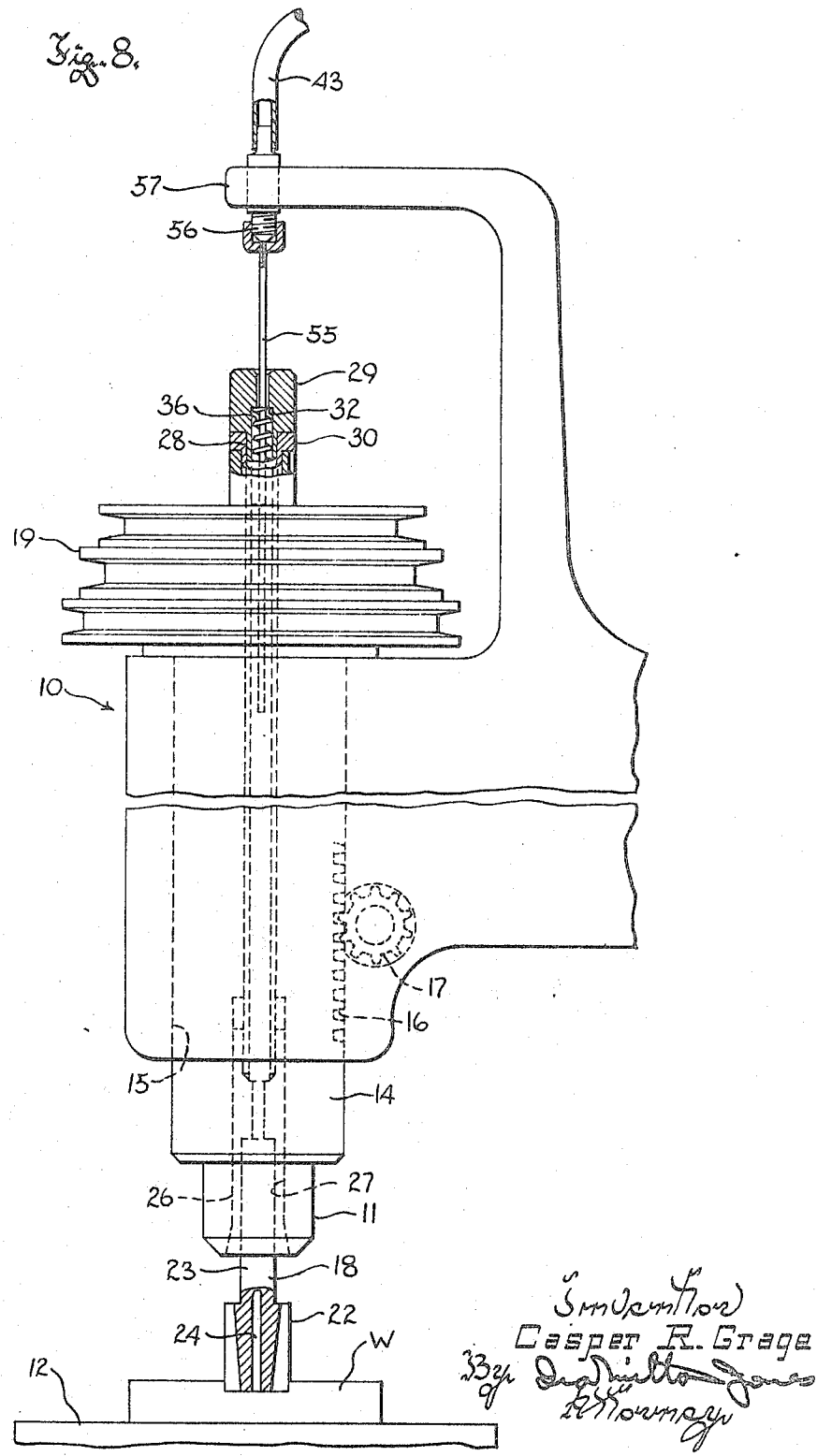

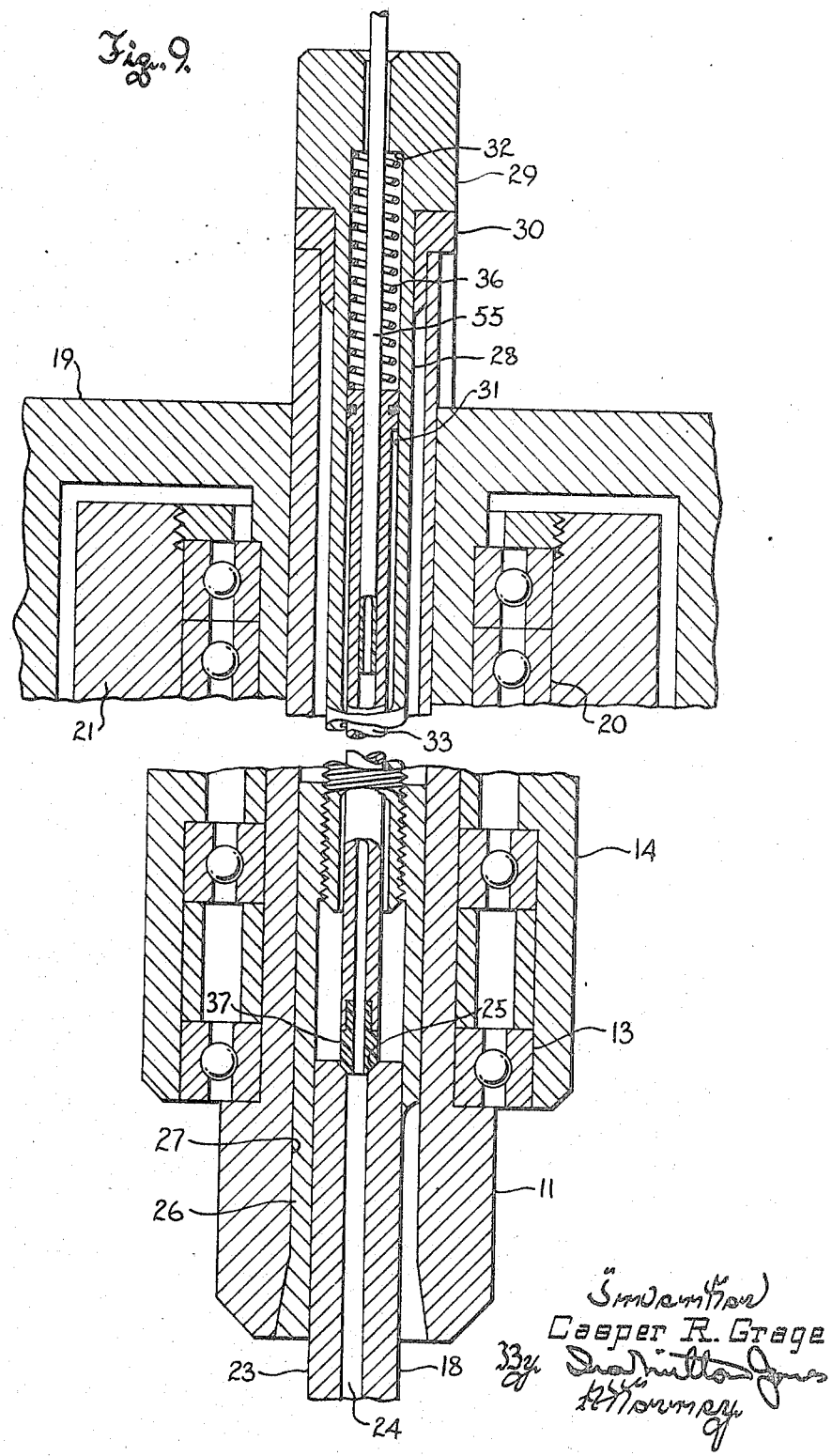

3,487,748
COOLANT APPLICATOR FOR ROTARY METAL CUTTING TOOLS
Casper R. Grage, Escondido, Calif., assignor to Contour Saws Incorporated, Des Plaines, Ill., a corporation of Illinois
Filed Apr. 29, 1968, Ser. No. 724,785
Int. Cl. B23c *1/00, 3/00, 7/00*
U.S. Cl. 90—11                                   9 Claims

ABSTRACT OF THE DISCLOSURE

A hollow vertically oriented spindle mounted for limited endwise movement has an end-cutting rotary cutter detachably secured to its lower end. A coolant supply tube extends down through the hollow spindle and has its lower end bearing against the end of the cutter shank and opening to the mouth of a coolant conducting bore in the shank. At the upper end of the spindle a bored coupling member connects the tube wtih a flexible coolant supply duct. The coupling member is restrained against rotation but free to move up and down with the spindle, and the tube has limited endwise movement with respect to the spindle. Spring means biases the coupling member and the tube downwardly. In a modified form of the disclosure, the coupling member is fixed against endwise movement as well as against rotation, and a plastic tube leading from the coupling member is slidably telescoped into the coolant supply tube in the spindle.

---

This invention relates broadly to metal cutting machine tools such as milling machines and, more especially end mills. In these machines the cutting tool is carried by a rotary spindle which moves axially or endwise as it rotates. The performance of such machine tools is greatly improved if a suitable coolant can be reliably applied to the cutting edge or edges of the cutting tool. This observation even applies to drills, as evidenced for instance by the Mossberg Patent No. 2,827,983.

However, the delivery of liquid coolant to the working face or cutting edges of a rapidly rotating reciprocating tool, has posed some difficult problems in the past, which this invention overcomes.

The primary purpose and object of this invention thus is to provide an improved way of delivering liquid coolant to the cutting edges of a rotating and endwise moving metal cutting tool.

More specifically the object of this invention is to provide a coolant applicator which is characterized by unprecedented simplicity, brought about primarily through the use of a hollow spindle and duct means coaxially disposed in the spindle to convey coolant to the mouth of a coolant passage in the cutting tool from a source thereof located exteriorily of the spindle.

The closest approach in the prior art to the structural combination of this invention is the burnishing machine illustrated in the J. W. Nesbitt Patent No. 1,749,982, issued Mar. 11, 1930. In the structure disclosed in that patent, the spindle has a pump cylinder at its lower end in open communication with a fluid passage in the burnishing tool which is attached to the pump cylinder. A piston in the pump cylinder is reciprocated by a rod which extends through the spindle. On the downstroke of the piston, lubricant is forced from the cylinder into the burnishing tool to press the burnishing laps against the work being acted upon by the machine, while during the upstroke of the piston, the burnishing laps are withdrawn from the work. Hence, despite the fact that the lubricant reaches the cylinder through a bore in the rod by which the piston is reciprocated, there is no teaching in the Nesbitt patent of the instant coolant applicator.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiment of the invention constructed according to the best modes so far devised for the practical application of the principles thereof, and in which:

FIGURE 1 is a longitudinal sectional view through the spindle of an end mill equipped with one embodiment of the coolant applicator of this invention;

FIGURE 2 is an enlarged sectional view of the upper or input end portion of the applicator;

FIGURE 3 is an enlarged sectional view through the lower delivery end portion of the applicator;

FIGURE 3A is a fragmentary detail view, mainly in longitudinal section, of part of the upper portion of the applicator;

FIGURE 4 is a cross sectional view through FIGURE 2 on the plane of the line 4—4;

FIGURE 5 is a view partly in elevation and partly in longitudinal section of an end mill provided with a modified embodiment of the coolant applicator of this invention;

FIGURES 6 and 7 are views similar to FIGURES 2 and 3, but illustrating the upper and lower portions of the applicator shown in FIGURE 5;

FIGURE 8 is a view essentially in side elevation, but with parts broken away, of an end mill coolant applicator of this invention; and FIGURE 9 is an enlarged longitudinal sectional view illustrating the upper and lower end portions of the structure shown in FIGURE 8.

Referring to the accompanying drawings, and especially to FIGURES 1 to 4, inclusive, which illustrate one embodiment of this invention, the numeral 10 designates generally that part of the frame of a conventional end mill, in which the spindle 11 of the machine is mounted for rotation and reciprocation on an axis which intersects a work supporting base or table 12. The spindle is journalled in bearings 13 which are mounted in a sleeve 14 reciprocably but non-rotatably received in a bore 15 in the frame portion. A rack 16 and pinion 17 provide means for reciprocating the sleeve and hence the spindle towards and from the work supporting base to enable a rotary cutting tool 18 detachably secured to the spindle to be moved into and out of a piece of work W on the base. The pinion may be manually rotated in any conventional way.

The upper end portion of the spindle 11 projects from the bore 15 and has a multi-diameter pulley 19 slidably splined to it. Bearings 20 set into a bearing cage 21 fixed with respect to the frame 10 freely rotatably mount the pulley and hold it against axial movement. Hence the pulley—when driven in the customary manner—will impart rotation to the spindle without interfering with axial motion of the spindle as required by the work being done.

The tool 18 has a cutter head 22 and a shank 23 with an axial bore 24 extending entirely therethrough, or at least from the mouth 25 of the bore at the end of the shank to the cutter head where it may continue axially through the head as shown, or extend laterally to the exterior of the head. In any event, the bore 24 provides a coolant passage leading to the cutting edges of the tool.

As is customary, the tool 18 is detachably secured to the spindle by means of a collet 26 which occupies a bore 27 in the lower end portion of the spindle and has a split and flared outer end to grip the shank of the tool as it is drawn up into the tapered mouth of the bore 27. For this purpose, a draw rod or tension rod 28 extends axially through the spindle which is tubular, and has its lower end portion threaded into the collet. A head 29, preferably polygonal in cross section, on the upper end of the rod 28, with a thrust bearing 30 between it and the adjacent end of the tubular spindle, enables torque to be applied to the rod to thread the same into the collet and thereby draw the latter upward.

To the extent thus far described, the structure is conventional, and would be the same whether the end mill is of the horizontal type in which the spindle axis is horizontal, or the vertical type illustrated.

A relatively slight modification of this conventional structure and the addition of a few parts provides the mill with a reliable, simple coolant applicator.

The only modification of existing structure resides in providing the draw rod or tension rod 28 with an axial bore 31 extending therethrough from end to end, and preferably reduced in diameter near its upper end to provide a downwardly facing shoulder 32. Within the bore 31 is a stiff tube 33, the upper end portion of which is enlarged to in effect provide a piston 34 by which the upper end portion of the bore 31 is sealed off from the rest of the bore. An O-ring 35 (see FIGURE 3a) encircling the piston 34 assures a fluid tight connection between the piston and the wall of the bore 31 without interfering with relative axial motion between the tube 33 and the rod 28.

A spring 36 confined between the shoulder 32 and the upper end of the tube 33 yieldingly urges the tube downward to project its lower end portion beyond the end of the draw rod 28 and into engagement with the end of the shank 23 of the tool. As best shown in FIGURE 3, the lower end of the tube 33 is preferably provided with a tip 37 of rubber or some other suitable material characterized by an ability to conform to a surface pressed against it. The extremity of this tip is chamfered or conical to have a mating fluid tight connection with the correspondingly shaped mouth 25 of the coolant passage in the tool.

As will be readily understood, when no tool is present in the collet 26, the spring 36 projects the tube 33 beyond the position it occupies when engaged by the shank of the tool so that upon insertion and attachment of a tool, the spring—though pre-loaded—is further compressed to assure the desired fluid tight connection between the tip 37 and the mouth of the coolant passage in the tool. Any suitable stop means may be provided to limit spring propelled projection of the tube 33 out of the bore 31, as for instance, a screw 38 threaded into a tapped hole in the wall of the tubular draw rod beneath the piston head of the tube (see FIGURE 3a).

From the description thus far, it will be seen that coolant introduced into the upper end of the bore 31 in the draw rod will be delivered to the coolant passage in the tool. To introduce coolant into the bore 31, a coupling member 40 is provided. This coupling member has a bore 41 extending axially therethrough to provide a fluid passage with an inlet and an outlet. At the inlet end of the passage, the coupling member has a nipple 42 to which a flexible hose 43 is attached to conduct liquid coolant into the coupling member from a source thereof— not shown—but which may be simply a container from which the coolant can flow by gravity. At the outlet end of the fluid passage provided by the bore 41, the coupling member has an end portion 44 with a tapered or conical tip to have mating engagement with the mouth of the bore 31 which is preferably flared.

The coupling member 40 is mounted above and coaxially with the spindle, in a manner accommodating endwise or axial motion, but not rotation thereof. Any suitable structure may be employed for this purpose, as—for instance—a bracket 45 on the frame portion 10, terminating in a barrel 46 in which the coupling member is slidably received. Although the coupling member and the bore of the barrel may be polygonal in cross section to hold the coupling member against rotation, it is more convenient to have both cylindrical and to provide the coupling member with a keyway 47 into which a key 48 projects, the latter being attached to the barrel in any suitable manner.

A compression spring 49 confined between the coupling member and a cap 50 removably secured to the upper end of the barrel, yieldingly urges the coupling member down and presses the tip of its lower end portion 44 against the head 29 of the draw rod. Thus, the coupling member will partake of any reciprocatory motion of the spindle; and by virtue of the mating engagement of the tip of the lower end portion 44 with the mouth of the bore 31, a fluid tight connection is maintained between the bore of the coupling member and the bore 31 during such up and down motion and despite the relative rotation which obtains between the non-rotating coupling member and the rotating draw rod.

Since it is not contemplated that the coolant will be under any significant pressure, the mating engagement between the tapered mouth of the bore 31 is sufficient to provide the desired fluid tight relationship at the free running, i.e. relative rotational connection therebetween, even though both surfaces are metal. However, it is preferable to have the coupling member or at least its lower end portion 44 formed of Teflon or some other material having similar attributes.

The embodiment of the invention illustrated in FIGURES 5 to 7, inclusive, distinguishes from that just described in one major respect—the location of the free running connection between the non-rotating and rotating parts of the coolant passage. Thus, in the structure of FIGURES 5–7, the tube 33' which extends through the bore 31 in the draw rod or tension rod is a physical part of or fixedly attached to the coupling member 40', and the tip 37 at the lower end of the tube is formed of substantially frictionless material such as Teflon, to accommodate the relative rotation between the non-rotating tool while assuring the desired fluid tight connection therebetween. In all other respects, the modified embodiment of the invention shown in FIGURES 5–7 is the same as that of FIGURES 1–4.

Both forms of the invention thus far described provide coolant application to the cutting tool regardless of the orientation of its axis. In other words, the spindle need not be vertical, as shown, but can be horizontal as it would be in a horizontal milling machine.

Where such versatility in orientation of the spindle axis is not required, and where only a vertically disposed spindle is involved, the introduction of coolant into the tube 33 can be effected in the extremely simple manner shown in FIGURE 8 and 9. In this case, a smooth surfaced plastic tube 55 having an outside diameter very slightly less than that of the bore in the tube 33 is telescoped into the latter from above. This plastic tube 55 is firmly held against rotation and/or endwise movement, in coaxial relationship to the spindle, by suitable mounting structure as, for instance, a tubular nipple 56 mounted in a supporting bracket 57.

In addition to providing an anchor for the tube 55, the nipple 56 serves the same coolant transfer function as the coupling member 40, and to that end has the hose 43 connected thereto. Coolant delivered by the hose thus flows down through the plastic tube 55 to debouch therefrom into the tube 33 despite rotation and/or endwise movement of the latter.

From the foregoing description, taken together with the accompanying drawings, it will be apparent to those skilled in the art that this invention provides a very practicable, reliable, simple and inexpensive way of delivering liquid coolant to the cutting edges or work performing portions of the rotary cutter of a milling machine, and especially an end mill, and that it constitutes a substantial improvement over prior coolant applicators for this purpose.

What is claimed as my invention is:

1. In a rotary metal cutting machine tool wherein a tubular spindle mounted for rotation and endwise movement has the shank of a cutting tool detachably secured to one end thereof, the cutting tool having a coolant receiving mouth at the end of its shank and an axially extending coolant conducting bore leading from said mouth to an outlet through which coolant reaches the cutting edges of the tool, means for delivering coolant to said mouth, comprising:

(A) a coupling member having a fluid passage with an inlet and an outlet;
(B) means mounting the coupling member coaxially of the spindle with the outlet of its fluid passage in line with the spindle axis,
said mounting means constraining the coupling member against rotation;
(C) means on the coupling member at the inlet of it's fluid passage for connecting a flexible supply duct thereto;
(D) a tube extending axially within the hollow spindle with one end thereof connecting with the outlet of the coupling member and its other end coaxial with the coolant receiving mouth of a cutting tool and positioned to be engaged thereby upon securement of the tool to the spindle, the tube having limited endwise movement with respect to the hollow spindle; and
(E) spring means biasing the tube axially towards the end of the spindle at which the cutting tool is secured, so that upon securement of the tool to the spindle,
a coolant transmitting connection is established between the tube and the coolant receiving mouth of the cutting tool.

2. In a rotary metal cutting machine tool, the coolant delivering means of claim 1, wherein the mounting means for the coupling member provides for reciprocation of the coupling member along the axis of the spindle; and further characterized by spring means yieldingly urging the coupling member axially towards the spindle.

3. The structure of claim 2, wherein the tube and the coupling member are physically connected to one another, and wherein the spring means biasing the tube aixally towards the end of the spindle at which the cutting tool is secured and the spring means yieldingly urging the coupling member axially towards the spindle is one spring reacting between the coupling member and its mounting means.

4. The structure of claim 3, further characterized by means on the tube providing a free-running substantially leak-proof seal between the tube and the mouth of the coolant conducting bore in the cutting tool.

5. The structure of claim 2, wherein the cutting tool is secured to the spindle by a draw bar which extends through the spindle and has a head which bears against the end of the spindle remote from the cutting tool,
and further characterized by the fact that said draw bar has an axial bore in which the tube is received, with the end of the tube that is remote from the cutting tool spaced inwardly of the adjacent end of the draw bar,
the coupling member having a free-running connection with the head of the draw bar to accommodate relative rotation therebetween,
and the outlet of the coupling member being communicated with the tube through the adjacent end portion of the bore in the draw bar,
and wherein the first spring means (recited in paragraph E of claim 1) is in said end portion of the bore in the draw bar and reacts between the adjacent end of the tube and a spring seat in the draw bar, and the second spring means (recited in claim 2) reacts between the coupling member and its mounting means to yieldingly hold the coupling member against the head of the draw bar and thereby maintain said free running connection therebetween.

6. The structure of claim 5, further characterized by means providing a fluid tight seal between the tube and said end portion of the bore in the draw bar, so that all coolant fed by the coupling member enters the tube.

7. In a rotary metal cutting machine tool wherein a tubular spindle mounted for rotation and endwise movement has the shank of a cutting tool detachably secured to one end thereof, the cutting tool having a coolant receiving mouth at the end of its shank and an axially extending coolant conducting bore leading from said mouth to an outlet through which coolant reaches the cutting edges of the tool, means for delivering coolant to said mouth, comprising:

(A) a tube inside the hollow spindle having one end thereof separably engaging the end of the shank of the tool and opening to its coolant receiving mouth;
(B) tubular coupling means at the other end of said tube for conducting coolant from a supply thereof to said tube,
said coupling means comprising coaxial rotatable and non-rotatable tubular elements, the former being fixed with respect to the spindle to rotate therewith and also partake of any endwise movement of the spindle, and the latter being restrained against rotation but being endwise movable,
said elements having mating surfaces; and
(C) spring means maintaining said mating end surfaces and the junction between the tube and the coolant receiving mouth of the tool in fluid tight engagement.

8. In a rotary metal cutting machine tool wherein a tubular spindle mounted for rotation and endwise movement has the shank of a cutting tool detachably secured to one end thereof, the cutting tool having a coolant receiving mouth at the end of its shank and an axially extending coolant conducting bore leading from said mouth to an outlet through which coolant reaches the cutting edges of the tool, means for delivering coolant to said mouth, comprising:

(A) a tube inside the hollow spindle,
said tube having limited endwise movement with respect to the spindle and having one end thereof adapted for sealing engagement with the coolant receiving mouth in the shank of a tool secured to the spindle;
(B) a spring reacting between the other end of the tube and the spindle to yieldingly urge the tube into sealing engagement with the coolant receiving mouth of the tool;
(C) tubular means fixed on the end of the spindle remote from the tool for conducting coolant only to the adjacent end of the tube;
(D) a coupling member having a bore extending therethrough;
(E) means non-rotatably mounting said coupling member in coaxial alignment with the spindle, in a manner accommodating axial movement thereof;
(F) mating surfaces on the adjacent ends of said tubular means and the coupling member, adapted when held in tight engagement to provide a fluid tight free running connection therebetween;
(G) spring means reacting between the coupling member and its mounting means yieldingly maintaining said mating surfaces in fluid tight engagement; and
(H) means for supplying coolant to the other end of the bore in the coupling member.

9. In a rotary metal cutting machine tool wherein a tubular spindle mounted for rotation and endwise movement has the shank of a cutting tool detachably secured to one end thereof, the cutting tool having a coolant receiving mouth at the end of its shank and an axially extending coolant conducting bore leading from said mouth to an outlet through which coolant reaches the cutting edges of the tool, means for delivering coolant to said mouth, comprising:

(A) a tube inside the hollow spindle,
said tube having limited endwise movement with respect to the spindle and having one end thereof adapted for sealing engagement with the coolant receiving mouth in the shank of a tool secured to the spindle;
(B) a spring reacting between the other end of the tube and the spindle to yieldingly urge the tube into sealing engagement with the coolant receiving mouth of the tool;
(C) a tubular duct telescoped into said tube and entering the same through said other end thereof, the tubular duct having a close though freely slidable and rotatable connection with the tube to accommodate rotation and endwise movement of the tube with respect to the tubular duct;
(D) means holding the tubular duct stationary and in coaxial alignment with the spindle; and
(E) means for connecting the tubular duct with a source of coolant.

References Cited

UNITED STATES PATENTS

| | | | |
|---|---|---|---|
| 1,195,145 | 8/1916 | Mattingly | 10—106 |
| 3,421,392 | 1/1969 | Bangerter | 10—106 X |

ANDREW R. JUHASZ, Primary Examiner

GIL WEIDENFELD, Assistant Examiner

U.S. Cl. X.R.

10—106; 77—55; 90—14

UNITED STATES PATENT OFFICE
CERTIFICATE OF CORRECTION

Patent No. 3,487,748　　　　　　　　　　　　　　　　January 6, 197

Casper R. Grage

It is certified that error appears in the above identified patent and that said Letters Patent are hereby corrected as shown below:

Column 4, line 43, after "non-rotating" insert -- tube and the rotating --.

Signed and sealed this 5th day of May 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents